(12) United States Patent
Mitsuhashi et al.

(10) Patent No.: US 7,851,529 B2
(45) Date of Patent: Dec. 14, 2010

(54) POLYCARBONATE RESIN COMPOSITION AND MOLDED ARTICLE

(75) Inventors: Kenichi Mitsuhashi, Chiba (JP); Akio Nodera, Chiba (JP); Hiroshi Kawato, Chiba (JP); Toshio Isozaki, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 355 days.

(21) Appl. No.: 11/944,774

(22) Filed: Nov. 26, 2007

(65) Prior Publication Data

US 2008/0076866 A1    Mar. 27, 2008

Related U.S. Application Data

(62) Division of application No. 10/524,836, filed as application No. PCT/JP03/09936 on Aug. 5, 2003, now abandoned.

(30) Foreign Application Priority Data

Aug. 26, 2002  (JP) ............................. 2002-244489

(51) Int. Cl.
*C08L 69/00* (2006.01)

(52) U.S. Cl. .................. 524/161; 524/451; 525/67; 525/92 A; 525/101; 525/104; 525/133; 525/146; 525/147; 525/464

(58) Field of Classification Search ............... None
See application file for complete search history.

(56) References Cited

U.S. PATENT DOCUMENTS

| | | | |
|---|---|---|---|
| 4,569,970 A * | 2/1986 | Paul et al. ............... | 525/67 |
| 4,652,602 A * | 3/1987 | Liu ........................ | 524/449 |
| 4,983,658 A * | 1/1991 | Kress et al. ............. | 524/141 |
| 5,066,717 A | 11/1991 | Eichenauer et al. | |
| 5,380,795 A * | 1/1995 | Gosens et al. .......... | 525/67 |
| 5,391,600 A | 2/1995 | Umeda et al. | |
| 5,621,029 A | 4/1997 | Eckel et al. | |
| 5,717,021 A | 2/1998 | Huang et al. | |
| 6,432,905 B1 | 8/2002 | Gowrishankaran et al. | |
| 6,613,824 B2 | 9/2003 | Campbell et al. | |
| 2003/0027928 A1* | 2/2003 | Okamoto et al. ........ | 525/101 |
| 2003/0139504 A1* | 7/2003 | Miebach et al. ......... | 524/261 |
| 2004/0178383 A1 | 9/2004 | Kikuchi | |
| 2005/0159533 A1 | 7/2005 | Nabeshima et al. | |

FOREIGN PATENT DOCUMENTS

| | | | |
|---|---|---|---|
| EP | 0 771 852 A2 | | 5/1997 |
| EP | 1 201 715 | | 5/2002 |
| EP | 1 489 140 | | 12/2004 |
| JP | 06-299060 | | 10/1994 |
| JP | 07186874 | * | 8/1995 |
| JP | 07196874 | * | 8/1995 |
| JP | 08081620 | | 3/1996 |
| JP | 10-101921 | | 4/1998 |
| JP | 2000-211403 | | 8/2000 |
| JP | 2001-2908 | | 1/2001 |
| JP | 2001072846 | * | 3/2001 |
| JP | 2001181342 | | 7/2001 |
| WO | 02/059205 | | 8/2002 |

OTHER PUBLICATIONS

Lange; Structure and Molecular Properties of ABS Polymers; Angewndte Makromolekulare Chemie 1970 (14) pp. 25-42.*
Database CA [Online] Chemical Abstracts Service, Columbus, Ohio, US, Kiuchi, et al. "Fireproofing agents for transparent polycarbonates" XP-002468490 retrieved from STN Database accession No. 135:62161; Jul. 2001.
Patent Abstracts of China, CN 1186826, Jul. 8, 1998 (corr. U.S. 5,717,021).
Patent Abstracts of China, CN 1345365, Apr. 17, 2002 (corr. U.S. 6,432,905).
Patent Abstracts of China, CN 1201807, Dec. 16, 1998.
Patent Abstracts of China, CN 1130198, Sep. 4, 1996 (corr. 5,621,029).

* cited by examiner

*Primary Examiner*—David Buttner
(74) *Attorney, Agent, or Firm*—Oblon, Spivak, McClelland, Maier & Neustadt, L.L.P.

(57) ABSTRACT

Provided are a polycarbonate resin composition which does not contain halogen and phosphorus as a flame retardant component and which is excellent in a fluidity while maintaining a flame resistance, a heat resistance and an impact resistance and a molded article thereof.

11 Claims, No Drawings

POLYCARBONATE RESIN COMPOSITION AND MOLDED ARTICLE

CROSS REFERENCE TO RELATED APPLICATIONS

This application is a division of U.S. patent application Ser. No. 10/524,836, filed Feb. 18, 2005, now abandoned, which was the national stage of International Application No. PCT/JP03/09936, filed Aug. 5, 2003, the disclosures of which are incorporated herein by reference in their entireties. This application claims priority to Japanese Patent Application No. 2002-244489, filed Aug. 26, 2002, the disclosure of which is incorporated herein by reference in its entirety.

BACKGROUND OF THE INVENTION

The present invention relates to a polycarbonate resin composition, more specifically to a polycarbonate resin composition which does not contain halogen and phosphorus as a flame retardant component and which is excellent in a fluidity while maintaining a flame resistance, a heat resistance and an impact resistance and a molded article thereof.

RELATED ART

A polycarbonate resin is widely used in various fields such as the electric and electronic equipment fields of OA (office automation) equipments, information and communication equipments and household electric equipments, the automobile field and the construction field because of excellent impact resistance, heat resistance, electrical characteristics and dimensional stability.

In general, a polycarbonate resin is a self-extinguishing resin, and when using it as a material for electric and electronic equipments such as OA equipments, information and communication equipments and household electric equipments, a high degree of the flame resistance is required in order to further enhance the safety.

A flame retardant used in the electric and electronic equipment field and the electric and OA equipment field transfers from halogen base flame retardants to non-halogen base flame retardants from the viewpoint of an environmental problem.

Among them, phosphorus base flame retardants are used as a flame retardant for a polycarbonate resin in many cases in recent years.

The phosphorus base flame retardants have a high fluidity and are used for large-sized equipments such as the exteriors of OA equipments and the housings of CRT, but they have the problems that the polycarbonate resin is reduced in a heat resistance and that the recycling property is deteriorated by hydrolysis caused in the polycarbonate resin.

On the other hand, silicon base flame retardants as a retardant of the next generation are under development in order to solve the above problems, but a polycarbonate resin composition having such fluidity that it can be used for the exteriors of OA equipments has not yet been developed.

DISCLOSURE OF THE INVENTION

In light of the existing situation described above, an object of the present invention is to provide a polycarbonate resin composition which shows an excellent flame resistance by adding a small amount of an additive in flame retardation of a polycarbonate resin provided by a non-halogen and non-phosphorus compound and which is excellent in a heat resistance, an impact resistance and a fluidity and a molded article thereof.

Intensive investigations repeated by the present inventors in order to achieve the object described above have resulted in making it possible to provide an aromatic polycarbonate resin composition with a high fluidity to a large extent while maintaining a flame resistance and a heat resistance by using an acrylonitrile-styrene base resin of a high fluidity having a melt flow rate (MFR) of 5 or more at 200° C. and a load of 5 kg.

Further, they have found that addition of an impact resistance-improving agent makes it possible to reveal the high impact resistance, and they have come to complete the present invention.

That is, the present invention relates to the following items.

1. A polycarbonate resin composition comprising (A) 60 to 97 mass % of an aromatic polycarbonate resin and 3 to 40 mass % of (B) an acrylonitrile-styrene base resin having a melt flow rate (MFR) of 5 or more at 200° C. and a load of 5 kg, wherein it is blended, if necessary, with 0 to 37 mass parts of (C) an impact resistance-improving agent, 0 to 3 mass parts of (D) an organic alkali metal salt and/or an organic alkali earth metal salt, 0 to 3 mass parts of (E) a functional group-containing silicone compound, 0 to 55 mass parts of (F) an inorganic filler and 0 to 2 mass parts of (G) a polyfluoroolefin resin each per total 100 mass parts of (A) and (B).
2. The polycarbonate resin composition as described in the above item 1, wherein the acrylonitrile-styrene base resin has a melt flow rate (MFR) of 15 or more at 200° C. and a load of 5 kg.
3. The polycarbonate resin composition as described in the above item 1, wherein the acrylonitrile-styrene base resin has a melt flow rate (MFR) of 30 or more at 200° C. and a load of 5 kg.
4. The polycarbonate resin composition as described in the above item 1, wherein the aromatic polycarbonate resin is a polyorganosiloxane-containing aromatic polycarbonate resin.
5. The polycarbonate resin composition as described in the above item 4, wherein polyorganosiloxane of the polyorganosiloxane-containing aromatic polycarbonate resin is polydimethylsiloxane.
6. The polycarbonate resin composition as described in any of the above items 1 to 5, wherein a molecular end of the aromatic polycarbonate resin is an alkyl group having 10 to 35 carbon atoms.
7. The polycarbonate resin composition as described in any of the above items 1 to 3, wherein the acrylonitrile-styrene base resin is an acrylonitrile-styrene copolymer.
8. The polycarbonate resin composition as described in any of the above items 1 to 5, wherein the impact resistance-improving agent is a core/shell type elastomer and/or a rubber component-containing styrene base resin.
9. The polycarbonate resin composition as described in any of the above items 1 to 5, wherein the organic alkali metal salt and/or the organic alkali earth metal salt are at least one selected from sulfonic acid alkali metal salts, sulfonic acid alkali earth metal salts, polystyrenesulfonic acid alkali metal salts and polystyrenesulfonic acid alkali earth metal salts.
10. The polycarbonate resin composition as described in any of the above items 1 to 9, wherein the functional group-containing silicone compound is organopolysiloxane having a fundamental structure presented by Formula (1):

$$R^1_a R^2_b SiO_{(4-a-b)/2} \tag{1}$$

wherein $R^1$ represents a functional group; $R^2$ represents a hydrocarbon group having 1 to 12 carbon atoms; and a and b are numbers satisfying the relation of $0 < a \leq 3$, $0 \leq b < 3$ and $0 < a+b \leq 3$.

11. The polycarbonate resin composition as described in the above item 10, wherein $R^1$ is at least one selected from an alkoxy group, a hydrogen group, a hydroxyl group, an epoxy group and a vinyl group.
12. The polycarbonate resin composition as described in any of the above items 1 to 5, wherein the inorganic filler is selected from a tabular filler and a glass fiber.
13. The polycarbonate resin composition as described in any of the above items 1 to 5, blended with 1 to 20 mass parts of the tabular filler and 5 to 35 mass parts of the glass fiber as the inorganic filler.
14. The polycarbonate resin composition as described in the above item 12, wherein the tabular filler is at least one selected from talc, mica and wollastonite.
15. The polycarbonate resin composition as described in any of the above items 1 to 5, wherein the polyfluoroolefin resin is polytetrafluoroethylene.
16. The polycarbonate resin composition as described in the above item 15, wherein the polytetrafluoroethylene is endowed with a fibril-forming ability and has an average molecular weight of 500,000 to 10,000,000.
17. A molded article comprising the polycarbonate resin composition as described in any of the above items 1 to 5.

BEST MODE FOR CARRYING OUT THE INVENTION

The present invention shall be explained below in details.
In the polycarbonate resin composition of the present invention, the polycarbonate resin (A) shall not specifically be restricted, and various ones can be given.
Usually, an aromatic polycarbonate resin produced by reacting divalent phenol with a carbonate precursor can be used.
Capable of being used is a resin produced by reacting divalent phenol with a carbonate precursor by a solution method or a melting method, that is, the reaction of divalent phenol with phosgene or the transesterification of divalent phenol with diphenyl carbonate.
Various compounds can be given as the divalent phenol. In particular, capable of being given are 2,2-bis(4-hydroxyphenyl)propane (bisphenol A), bis(4-hydroxyphenyl)methane, 1,1-bis(4-hydroxyphenyl)ethane, 2,2-bis(4-hydroxy-3,5-dimethylphenyl)propane, 4,4'-dihydroxydiphenyl, bis(4-hydroxyphenyl)cycloalkane, bis(4-hydroxyphenyl)oxide, bis(4-hydroxyphenyl)sulfide, bis(4-hydroxyphenyl)sulfone, bis(4-hydroxyphenyl)sulfoxide, bis(4-hydroxyphenyl)ether and bis(4-hydroxyphenyl)ketone.
The particularly preferred divalent phenols are bis(hydroxyphenyl)alkanes, particularly the compounds comprising bisphenol A as a principal raw material.
The carbonate precursor includes carbonyl halides, carbonyl esters and haloformates, to be specific, phosgene, dihaloformates of divalent phenols, diphenyl carbonate, dimethyl carbonate and diethyl carbonate.
In addition thereto, hydroquinone, resorcin and catechol can be given as the divalent phenol.
The above divalent phenols each may be used alone or in a mixture of two or more kinds thereof.
The polycarbonate resin may have a branched structure, and the branching agent includes 1,1,1-tris(4-hydroxyphenyl)ethane, α, α', α''-tris(4-hydroxyphenyl)-1,3,5-triisopropylbenzene, fluoroglycine, trimellitic acid and isatinbis(o-cresol).
Phenol, p-t-butylphenol, p-t-octylphenol and p-cumylphenol are used in order to control the molecular weight.

Capable of being used as the polycarbonate resin used in the present invention are copolymers such as polyester-polycarbonate resins obtained by carrying out the polymerization of polycarbonate under the presence of difunctional carboxylic acid such as terephthalic acid or an ester precursor such as an ester-forming derivative thereof or the mixtures of various polycarbonate resins.
The polycarbonate resin used in the present invention has a viscosity average molecular weight of usually 10,000 to 50,000, preferably 13,000 to 35,000 and more preferably 15,000 to 20,000.
The above viscosity average molecular weight (Mv) is obtained by measuring a viscosity of a methylene chloride solution at 20° C. by means of a Ubbelohde viscometer and determining a limiting viscosity [η] from the above viscosity to calculate the viscosity average molecular weight according to the following equation:

$$[\eta]=1.23\times10^{-5}Mv^{0.83}$$

In the polycarbonate resin composition of the present invention, the polycarbonate resin includes a polyorganosiloxane-containing aromatic polycarbonate resin.
The polyorganosiloxane-containing aromatic polycarbonate resin comprises a polycarbonate part and a polyorganosiloxane part, and it can be produced, for example, by dissolving a polycarbonate oligomer and polyorganosiloxane having a reactive group at a terminal constituting a polyorganosiloxane part in a solvent such as methylene chloride and adding thereto a sodium hydroxide aqueous solution of bisphenol A to carry out interfacial polycondensation reaction using a catalyst such as triethylamine.
The polyorganosiloxane-containing aromatic polycarbonate resin is disclosed in, for example, Japanese Patent Application Laid-Open No. 292359/1991, Japanese Patent Application Laid-Open No. 202465/1992, Japanese Patent Application Laid-Open No. 81620/1996, Japanese Patent Application Laid-Open No. 302178/1996 and Japanese Patent Application Laid-Open No. 7897/1998.
Preferably used is the polyorganosiloxane-containing aromatic polycarbonate resin having a polymerization degree of 3 to 100 in a polycarbonate part and a polymerization degree of 2 to 500 in a polyorganosiloxane part.
The polyorganosiloxane of the polyorganosiloxane-containing aromatic polycarbonate resin has a content falling in a range of usually 0.1 to 2 mass %, preferably 0.3 to 1.5 mass W.
The polyorganosiloxane of the polyorganosiloxane-containing aromatic polycarbonate resin used in the present invention has a viscosity average molecular weight of usually 5,000 to 100,000, preferably 10,000 to 30,000 and particularly preferably 12,000 to 30,000.
The polyorganosiloxane-containing aromatic polycarbonate resin is useful from the viewpoint of a rise in a flame resistance and an impact resistance.
In the polyorganosiloxane-containing aromatic polycarbonate resin, polyorganosiloxane is preferably polydimethylsiloxane, polydiethylsiloxane and polymethylphenylsiloxane, particularly preferably polydimethylsiloxane.
In this connection, the viscosity average molecular weight (Mv) thereof can be determined in the same manner as in the polycarbonate resin described above.
Further, in the polyorganosiloxane-containing aromatic polycarbonate resin of the present invention, the polycarbonate resin includes polycarbonate resins having an alkyl group having 10 to 35 carbon atoms at a molecular end.
In this regard, the polycarbonate resin having an alkyl group having 10 to 35 carbon atoms at a molecular end can be obtained by using alkylphenol having an alkyl group having 10 to 35 carbon atoms as an end-terminating agent in the production of the polycarbonate resin.

The above alkylphenols include decylphenol, undecylphenol, dodecylphenol, tridecylphenol, tetradecylphenol, pentadecylphenol, hexadecylphenol, heptadecylphenol, octadecylphenol, nonadecylphenol, icosylphenol, docosylphenol, tetracosylphenol, hexacosylphenol, octacocylphenol, triacontylphenol, dotriacontylphenol and pentatiracontylphenol.

The alkyl groups in the above alkylphenols may be present in any position of o-, m- and p-, and it is present preferably in the position of p-.

The alkyl groups may be linear, branched or a mixture thereof.

The substituents therefor may be any ones as long as at least one of them is the alkyl group having 10 to 35 carbon atoms described above, and the other four groups shall not specifically be restricted and may be alkyl groups having 1 to 9 carbon atoms, aryl groups having 6 to 20 carbon atoms, halogen atoms or they may be non-substituted.

The above polycarbonate resin having an alkyl group having 10 to 35 carbon atoms at a molecular end may be any of polycarbonate base resins described later, and it is obtained, for example, by using the above alkylphenols as an end-sealing agent in order to control a molecular weight in the reaction of divalent phenol with phosgene or a carbonic ester compound.

For example, it is obtained by reacting divalent phenol with phosgene or a polycarbonate oligomer in a methylene chloride solvent in the presence of a triethylamine catalyst and the phenol having an alkyl group having 10 to 35 carbon atoms described above.

In this respect, the phenol having an alkyl group having 10 to 35 carbon atoms seals one end or both ends of the polycarbonate resin to modify the end thereof.

In the above case, the end is modified in a proportion of 20% or more, preferably 50% or more based on all ends.

That is, the other ends are sealed by using a hydroxyl group end-sealing agent or other end-sealing agents described below.

In this regard, capable of being given as the other end-sealing agents are phenol, p-cresol, p-tert-butylphenol, p-tert-octylphenol, p-cumylphenol, p-nonylphenol, p-tert-amylphenol, bromophenol, tribromophenol and pentabromophenol.

Among them, the compounds containing no halogens are preferred from the viewpoint of an environmental problem.

The aromatic polycarbonate resin having an alkyl group having 10 to 35 carbon atoms at a molecular end is preferred for elevating a fluidity.

If the molecular end is endowed with an alkyl group having 10 or more carbon atoms, the polycarbonate resin composition rises in a fluidity.

However, if the molecular end is an alkyl group having 36 or more carbon atoms, the heat resistance and the impact resistance are reduced.

Resins having a melt flow rate (MFR) of 5 or more, preferably 14 or more at 200° C. and a load of 5 kg are used as the acrylonitrile-styrene base resin (B). If the melt flow rate (MFR) is less than 5, the satisfactory fluidity is not obtained.

The acrylonitrile-styrene base resin has an acrylonitrile content of preferably 15 to 40 mass %, more preferably 20 to 30 mass %.

If the acrylonitrile content is less than 15 mass % or exceeds 40 mass %, likely to be brought about are the problems such as a reduction in the impact resistance and layer peeling which are caused by a reduction in the compatibility between the polycarbonate resin and the acrylonitrile-styrene base resin.

The acrylonitrile-styrene base resin described above includes preferably acrylonitrile-styrene copolymers.

The commercially available products thereof include, for example, BS-218 (manufactured by Nippon A & L Co., Ltd.) and 290FF (manufactured by Technopolymer Co., Ltd.).

The polycarbonate resin composition of the present invention attempts to remove layer peeling and elevate a fluidity while maintaining a flame resistance and a heat resistance of the resin composition by blending the polycarbonate resin with the acrylonitrile-styrene base resin.

In this respect, the blending ratios of both resins are 60 to 97 mass %, preferably 70 to 95 mass % and more preferably 75 to 95 mass % for the polycarbonate resin (A) and 3 to 40 mass %, preferably 5 to 30 mass % and more preferably 5 to 25 mass % for the acrylonitrile-styrene base resin (B).

If the ratio of the acrylonitrile-styrene base resin is less than 3 mass %, the satisfactory fluidity is not obtained. If it exceeds 40 mass %, the flame resistance and the impact resistance are reduced.

The impact resistance-improving agent (C) includes preferably a core/shell type elastomer and a rubber component-containing styrene base resin.

The core/shell type elastomer has a two layer structure constituted from a core and a shell and is a graft rubber-like elastic matter in which a core part is soft rubber-like and a shell part on the surface thereof is hard resin-like and in which the elastomer itself is powder-like (particle-like).

A great part of the above core/shell type elastomer maintains an original form in a particle state thereof even after molten and blended with the aromatic polycarbonate resin.

A great part of the core/shell type elastomer blended maintains an original form, whereby the effect of uniformly dispersing and bringing about no surface layer peeling is obtained.

Various elastomers can be given as the core/shell type elastomer.

The commercially available products include, for example, KM-330 (manufactured by Rohm & Haas Co., Ltd.), Metabrane W529, Metabrane S2001 and C223A (manufactured by Mitsubishi Rayon Co., Ltd.), KM357, EXL2315 and EXL2603 (manufactured by Kureha Chemical Industry Co., Ltd.) and Hibrane B621 (manufactured by Zeon Corporation).

Among them, preferred are, for example, products obtained by polymerizing at least one vinyl base monomer under the presence of a rubber-like polymer obtained from a monomer comprising mainly alkyl acrylate, alkyl methacrylate, dimethylsiloxane and a diene base compound.

In this regard, alkyl acrylate and alkyl methacrylate having an alkyl group having 2 to 10 carbon atoms are suited.

To be specific, they include, for example, ethyl acrylate, butyl acrylate, 2-ethylhexyl acrylate and n-octyl methacrylate.

The core/shell type elastomers obtained from the monomers comprising mainly the above alkyl acrylates include polymers obtained by reacting 70 mass % or more of alkyl acrylates with 30 mass % or less of other vinyl base monomers which can be copolymerized with them, for example, methyl methacrylate, acrylonitrile, vinyl acetate and styrene.

The specific examples of rubber obtained from the diene base compound include polybutadiene, rubber-like polymers comprising acrylate and/or methacrylate, styrene-butadiene-styrene rubber (SBS), styrene-butadiene rubber (SBR), butadiene-acryl rubber, isoprene rubber, isoprene-styrene rubber, isoprene-acryl rubber and ethylene-propylene rubber.

In the above case, multifunctional monomers such as divinylbenzene, ethylene dimethacrylate, triallyl cyanurate and triallyl isocyanurate may suitably added as a cross-linking agent to carry out the reaction.

The vinyl base monomer reacted under the presence of the rubber-like polymer includes, for example, aromatic vinyl compounds such as styrene and α-methylstyrene, acrylic esters such as methyl acrylate and ethyl acrylate, methacrylic esters such as methyl methacrylate and ethyl methacrylate and cyanide vinyl compounds such as acrylonitrile and methacrylonitrile.

The above monomers may be used alone or in combination of two or more kinds thereof or may be copolymerized with other vinyl base monomers, for example, vinyl ester compounds such as vinyl acetate and vinyl propionate.

The above polymerization reaction can be carried out by various methods such as, for exampled, bulk polymerization, suspension polymerization and emulsion polymerization. In particular, an emulsion polymerization method is suited.

The rubber-like polymers contained in the core/shell type elastomer thus obtained have a content of preferably more than 20 mass %.

The core/shell type elastomer thus obtained includes, to be specific, MAS resin elastic matters such as graft copolymers of 60 to 80 mass % of n-butyl acrylate with styrene and methyl methacrylate.

The commercially available products include KM357P and EXL2315 (manufactured by Kureha Chemical Industry Co., Ltd.).

Also, particularly preferred is a composite rubber base elastomer obtained by graft-polymerizing at least one vinyl monomer with a composite rubber having an average particle diameter of 0.01 to 1 μm and having a structure in which 5 to 95 mass % of a polysiloxane rubber component gets intertwined each other with 95 to 5 mass % of a polyacryl (meth) acrylate rubber component so that they can not be separated.

The above composite rubber base elastomer has a higher impact resistance-improving effect than those of graft copolymers obtained from the respective rubbers alone.

The commercially available product of the above composite rubber base elastomer includes Metabrane S200 (manufactured by Mitsubishi Rayon Co., Ltd.).

The commercially available product of the diene base rubber base elastomer includes C223A (manufactured by Mitsubishi Rayon Co., Ltd.) and EXL2603 (manufactured by Kureha Chemical Industry Co., Ltd.).

The rubber component-containing styrene base resin is preferably an impact resistant styrene base resin obtained by graft-polymerizing at least a styrene base monomer with rubber. The rubber component-containing styrene base resin includes, for example, high impact polystyrene (HIPS) obtained by polymerizing styrene with rubber such as polybutadiene and ABS resins obtained by polymerizing polybutadiene with acrylonitrile and styrene. Two or more kinds of the rubber component-containing styrene base resins can be used in combination, and it can be used as well in a mixture with the styrene base resin described above which is not modified with rubber.

The rubber contained in the rubber component-containing styrene base resin has a content of preferably 5 to 80 mass %, more preferably 10 to 70 mass %.

If a proportion of the rubber is less than 5 mass %, the impact resistance is unsatisfactory. On the other hand, if it exceeds 80 mass %, the problems such as a reduction in the heat stability, a reduction in the melt fluidity, a production in gel and coloring are brought about in a certain case.

The specific examples of the rubber described above include polybutadiene, rubber-like polymers comprising acrylate and/or methacrylate, styrene•butadiene•styrene rubber (SBS), styrene•butadiene rubber (SBR), butadiene•acryl rubber, isoprene rubber, isoprene•styrene rubber, isoprene•acryl rubber and ethylene•propylene rubber.

Among them, polybutadiene is particularly preferred.

Polybutadiene used in the above may be any one of low cis-polybutadiene (for example, polybutadiene containing 1 to 30 mole % of a 1,2-vinyl bond and 30 to 42 mole % of a 1,4-cis bond) and high cis-polybutadiene (for example, polybutadiene containing 20 mole % or less of a 1,2-vinyl bond and 78 mole % or more of a 1,4-cis bond), or it may be a mixture thereof.

The commercially available products thereof include, to be specific, B600N (manufactured by Ube Cyclon Co., Ltd.), DP-35 (manufactured by Technopolymer Co., Ltd.) and AT-05 (manufactured by Nippon A & L Co., Ltd.).

The impact resistance-improving agent has a content of 0 to 37 mass parts, preferably 1 to 20 mass parts per 100 mass parts of the aromatic polycarbonate resin (A) and the acrylonitrile-styrene base resin (B).

If the content exceeds 37 mass parts, the flame resistance, the heat resistance and the rigidity are reduced in a certain case.

The organic alkali metal salt and/or the organic alkali earth metal salt (D) include various compounds and are alkali metal salts and alkali earth metal salts of organic acids or organic acid esters each having at least one carbon atom.

In this regard, the organic acids or the organic acid esters are organic sulfonic acid, organic carboxylic acid and polystyrenesulfonic acid.

On the other hand, the alkali metals are sodium, potassium, lithium and cesium, and the alkali earth metals are magnesium, calcium, strontium and barium.

Among them, the salts of sodium, potassium and cesium are preferably used.

Also, the salts of the organic acids may be substituted with halogen such as fluorine, chlorine and bromine.

Among various kinds of the organic alkali metal salts and/or the organic alkali earth metal salts described above, the alkali metal salts and the alkali earth metal salts of perfuloroalkanesulfonic acid represented by Formula (2) are preferably used in the case of the organic sulfonic acid:

$$(C_nF_{2n+1}SO_3)_mM \qquad (2)$$

wherein n represents an integer of 1 to 10; M represents alkali metal such as lithium, sodium, potassium and cesium or alkali earth metal such as magnesium, calcium, strontium and barium; and m represents an atomic value of M.

Compounds described in, for example, Japanese Patent Publication No. 40445/1972 correspond to the above compounds.

In Formula (2), capable of being given as the perfluoroalkanesulfonic acid are, for example, perfluoromethanesulfonic acid, perfluoroethanesulfonic acid, perfluoropropanesulfonic acid, perfluorobutanesulfonic acid, perfluoromethylbutanesulfonic acid, perfluorohexanesulfonic acid, perfluoroheptanesulfonic acid and perfluorooctanesulfonic acid.

In particular, the potassium salts thereof are preferably used.

In addition thereto, capable of being given are the alkali metal salts and the alkali earth metal salts of organic sulfonic acids such as alkylsulfonic acid, benzenesulfonic acid, alkylbenzenesulfonic acid, diphenylsulfonic acid, naphthalenesulfonic acid, 2,5-dichlorobenzenesulfonic acid, 2,4,5-trichlorobenzenesulfonic acid, diphenylsulfone-3-sulfonic acid, diphenylsulfone-3,3'-disulfonic acid, naphthalenetrisulfonic acid and fluorine-substituted compounds thereof and polystyrenesulfonic acid.

In particular, perfluoroalkanesulfonic acids and diphenylsulfonic acid are preferred.

Next, a sulfonic acid salt group-containing aromatic vinyl base resin represented by Formula (3) can be used as the alkali metal salts and/or the alkali earth metal salts of polystyrenesulfonic acid:

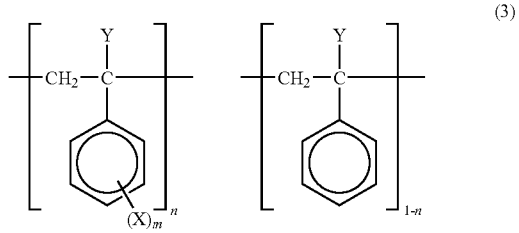

wherein X represents a sulfonic acid salt group; m represents 1 to 5; Y represents hydrogen or hydrocarbon group having 1 to 10 carbon atoms; and n represents a mole ratio and is $0<n\leq 1$.

In this regard, the sulfonic acid salt group is alkali metal salt and/or alkali earth metal salt of sulfonic acid, and the metal includes sodium, potassium, lithium, rubidium, cesium, beryllium, magnesium, calcium, strontium and barium.

Y is hydrogen or hydrocarbon group having 1 to 10 carbon atoms, preferably hydrogen or methyl group.

Also, m is 1 to 5, and n has a relation of $0<n\leq 1$.

That is, the aromatic ring may be substituted wholly or partially with the sulfonic acid salt group (X) or the non-substituted ring may be included therein.

A substitution ratio of the sulfonic acid salt group for obtaining the effect of the flame resistance in the present invention is determined considering a content of the sulfonic acid salt-containing aromatic vinyl base resin, and it shall not specifically be restricted. In general, the resin having a substitution ratio of 10 to 100% is used.

In the alkali metal salts and/or the alkali earth metal salts of the polystyrenesulfonic acid, the sulfonic acid salt group-containing aromatic vinyl base resin shall not be restricted to the polystyrene resin represented by Formula (3), and it may be copolymers with other monomers which can be copolymerized with styrene base monomers.

In this respect, a production process for the sulfonic acid salt-containing aromatic vinyl base resin includes (1) a process in which the aromatic vinyl base monomers having a sulfonic acid salt group described above are polymerized or copolymerized with other monomers capable of being copolymerized with them and (2) a process in which an aromatic vinyl base polymer or a copolymer of an aromatic vinyl base monomer with other copolymerizable monomers or a mixed polymer thereof is sulfonated and neutralized by alkali metal salt and/or alkali earth metal salt.

In the case of, for example, the process (2), a mixed solution of conc. sulfuric acid and acetic anhydride is added to a 1,2-dichloroethane solution of a polystyrene resin and heated to react them for several hours, whereby a polystyrene-sulfonated product is produced. Then, it is neutralized by potassium hydroxide or sodium hydroxide of a mole amount equivalent to that of a sulfonic acid group, whereby a polystyrenesulfonic acid potassium salt or a polystyrenesulfonic acid sodium salt can be obtained.

The sulfonic acid salt-containing aromatic vinyl base resin used in the present invention has a weight average molecular weight of 1,000 to 300,000, preferably 2,000 to 200,000. The weight average molecular weight can be determined by a GPC method.

Capable of being given as the organic carboxylic acid are, for example, perfluoroformic acid, perfluoromethanecarboxylic acid, perfluoroethanecarboxylic acid, perfluoropropanecarboxylic acid, perfluorobutanecarboxylic acid, perfluoromethylbutanecarboxylic acid, perfluorohexanecarboxylic acid, perfluoroheptanecarboxylic acid and perfluorooctanecarboxylic acid, and the alkali metal salts and the alkali earth metal salts of the above organic carboxylic acids are used.

The alkali metal and the alkali earth metal are the same as described above.

In the organic alkali metal salts and the organic alkali earth metal salts, preferred are sulfonic acid alkali metal salts, sulfonic acid alkali earth metal salts, polystyrenesulfonic acid alkali metal salts and polystyrenesulfonic acid alkali earth metal salts.

The organic alkali metal salts and/or the organic alkali earth metal salts may be used alone or in combination of two or more kinds thereof.

The organic alkali metal salts and/or the organic alkali earth metal salts are added in order to further elevate the flame resistance and the mold releasing property, and the organic alkali metal salts and/or the organic alkali earth metal salts have a content of 0 to 3 mass parts, preferably 0.05 to 1 mass part per 100 mass parts of the aromatic polycarbonate resin (A) and the acrylonitrile-styrene base resin (B).

If the content exceeds 3 mass parts, not only the higher flame resistance is not obtained any more, but also the physical properties such as the impact resistance and the like are reduced to a large extent.

The functional group-containing silicone compound (E) is a functional group-containing organopolysiloxane compound, and it is an organopolysiloxane polymer and/or a copolymer having a fundamental structure presented by Formula (1):

wherein $R^1$ represents a functional group; $R^2$ represents a hydrocarbon group having 1 to 12 carbon atoms; and a and b are numbers satisfying the relation of $0<a\leq 3$, $0\leq b<3$ and $0<a+b\leq 3$.

The functional group contains an alkoxy group, an aryloxy group, a polyoxyalkylene group, a hydrogen group, a hydroxyl group, a carboxyl group, a silanol group, an amino group, a mercapto group, an epoxy group and a vinyl group.

Among them, an alkoxy group, a hydroxyl group, a hydrogen group, an epoxy group and a vinyl group are preferred.

Capable of being used in combination are the organopolysiloxane polymer and/or the copolymer having a plurality of the above functional groups and the organopolysiloxane polymer and/or the copolymer having different functional groups.

In the organopolysiloxane polymer and/or the copolymer having the fundamental structure presented by Formula (1), the functional group ($R^1$)/the hydrocarbon group ($R^2$) is usually 0.1 to 3, preferably 0.3 to 2.

The above functional group-containing silicone compounds is liquid or powder and has preferably a good dispersibility in melting and mixing.

For example, the liquid compound having a viscosity of 10 to 500,000 cst can be given as the example thereof.

In the polycarbonate resin composition of the present invention, even if the above functional group-containing silicone compound is liquid, it is characterized by that it is evenly dispersed in the composition and that it bleeds less in molding or on the surface of the molded article.

The functional group-containing silicone compound is added in order to further elevate the flame resistance, and the functional group-containing silicone compound has a content of 0 to 3 mass parts, preferably 0.1 to 2 mass parts per 100 mass parts of the aromatic polycarbonate resin (A) and the acrylonitrile-styrene base resin (B).

If the content exceeds 3 mass parts, it causes a deterioration in the appearance and a reduction in the impact resistance and the heat resistance.

Used as the inorganic filler (F) are talc, mica, wollastonite, kaolin, diatomaceous earth, calcium carbonate, calcium sulfate, barium sulfate, a glass fiber, a carbon fiber and potassium titanate.

Among the above inorganic fillers, the glass fiber and the fillers having a tabular form, for example, talc, mica and wollastonite are particularly preferred.

Talc is silicate hydrate of magnesium, and commercially available products can be used.

Any of fibers prepared using alkali-containing glass, low alkali glass and non-alkali glass as raw materials can suitably be used.

The above glass fibers shall not specifically be restricted in a form thereof, and the fibers having any forms, for example, a roving, a milled fiber and a chopped strand can be used.

The commercially available products of the glass fiber include CSH-3PA (manufactured by Nittobo Co., Ltd.), T511 (manufactured by Nippon Electric Glass Co., Ltd.) and MA409C (manufactured by Asahi Glass Fiber Co., Ltd.).

Further, the inorganic fillers having an average particle diameter of 0.1 to 50 μm are used, and the fillers having an average particle diameter of 0.2 to 20 μm are particularly suitably used.

The inorganic filler (F) is added in order to elevate the rigidity and the dimension accuracy and further elevate the flame resistance, and the inorganic filler has a content of 0 to 55 mass parts, preferably 0 to 40 mass parts and more preferably 0 to 20 mass parts per 100 mass parts of the aromatic polycarbonate resin (A) and the acrylonitrile-styrene base resin (B).

In particular, in the case of placing great importance on the balance of a rise in the rigidity, the dimension accuracy, the flame resistance and the fluidity, the content is 3 to 40 mass parts, preferably 3 to 20 mass part and more preferably 3 to 15 mass parts.

If the content exceeds 55 mass parts, the impact resistance, the appearance, the flame resistance and the fluidity are reduced.

Among the inorganic fillers, the glass fiber has a content of preferably 5 to 35 mass parts, more preferably 5 to 30 mass parts.

Also, the tabular filler has a content of preferably 1 to 20 mass parts, more preferably 3 to 10 mass parts.

Combined use of the glass fiber and the tabular filler in the contents described above makes it possible to reveal the high fluidity while maintaining the flame resistance and the heat resistance.

The polyfluoroolefin resin (G) is usually a polymer and a copolymer containing a fluoroethylene structure and includes, for example, difluoroethylene polymers, tetrafluoroethylene polymers, tetrafluoroethylene-hexafluoropropylene copolymers and copolymers of tetrafluoroethylene and ethylene base monomers containing no fluorine.

It is preferably polytetrafluoroethylene (PTFE) and has an average molecular weight of preferably 500,000 or more, particularly preferably 500,000 to 10,000,000.

All kinds of compounds which are known at present can be used as polytetrafluoroethylene which can be used in the present invention.

Among polytetrafluoroethylenes, the compounds having a fibril-forming ability are preferred.

Polytetrafluoroethylene (PTFE) having a fibril-forming ability shall not specifically be restricted and includes, for example, compounds classified to Type 3 in an ASTM standard.

The specific examples thereof include, for example, Teflon 6-J (manufactured by Mitsui-Du Pont Fluorochemical Co., Ltd.), Polyflon D-1, Polyflon F-103 and Polyflon F201 (manufactured by Daikin Industries, Ltd.) and CD076 (manufactured by Asahi ICI Fluoropolymers Co., Ltd.).

In addition to the compounds classified to Type 3 described above, it includes, for example, Argo Flon F5 (manufactured by Monte Fluos Co., Ltd.) and Polyflon MPA and Polyflon FA-100 (manufactured by Daikin Industries, Ltd.).

The above polytetrafluoroethylenes (PTFE) may be used alone or in combination of two or more kinds thereof.

Polytetrafluoroethylene (PTFE) having a fibril-forming ability as described above can be obtained by, for example, polymerizing tetrafluoroethylene in an aqueous solvent at a pressure of 1 to 100 psi and a temperature of 0 to 200° C., preferably 20 to 100° C. under the presence of sodium, potassium or ammoniumperoxy disulfide.

The polyfluoroolefin resin is added in order to further elevate the flame resistance (for example, V-0, 5V), and the polyfluoroolefin resin has a content of 0 to 2 mass parts, preferably 0.1 to 1 mass part per 100 mass parts of the aromatic polycarbonate resin (A) and the acrylonitrile-styrene base resin (B).

If the content exceeds 2 mass parts, the flame resistance is not raised in proportion to an addition amount.

In the polycarbonate resin composition of the present invention, the other synthetic resins and elastomers can be added to the component comprising (A) to (G) described above for the purpose of improving the moldability, the impact resistance, the appearance, the weatherability and the rigidity.

Additive components which are usually used for thermoplastic resins can be added as well if necessary.

Capable of being are, for example, a phenol base, phosphorus base or sulfur case antioxidant, an antistatic agent, a polyamidepolyether block copolymer (providing a permanent antistatic performance), a benzotriazole base or benzophenone base UV absorber, a hindered amine base light stabilizer (weather resistant agent), a mold releasing agent, a plasticizer, a fungicide, a compatibility accelerating agent and a colorant (dye, pigment).

A blending amount of the optional components shall not specifically be restricted as long as the characteristics of the polycarbonate resin composition of the present invention are maintained.

Next, the production process of the polycarbonate resin composition of the present invention shall be explained.

The polycarbonate resin composition of the present invention is obtained by blending the respective components (A) to (G) described above in the proportions described above and, if necessary, various optional components in suitable proportions and kneading them.

Blending and kneading can be carried out by a method in which preliminary mixing is carried out by means of an apparatus usually used, for example, a ribbon blender and a drum tumbler and in which used are a Henschel mixer, a Banbury mixer, a single shaft screw extruding machine, a double shaft screw extruding machine, a multishaft screw extruding machine and a cokneader.

A heating temperature in kneading is suitably selected usually in a range of 240 to 300° C.

In above melting, kneading and molding, an extrusion-molding machine, particularly an extrusion-molding machine of a bent type is preferably used.

The components other than the polycarbonate resin can be added by melting and kneading in advance with the polycarbonate resin or the other thermoplastic resin, that is, in the form of a master batch.

Various molded articles can be produced from the polycarbonate resin composition of the present invention by means of the melt-kneading molding machine described above or by an injection molding method, an injection compression molding method, an extrusion molding method, a blow molding method, a press molding method, a vacuum molding method and a foaming molding method using the resulting pellets as a raw material.

However, a pellet-like molding raw material is produced by the melt-kneading method described above, and then this pellet is particularly suitably used for producing an injection-molded article by injection molding and injection compression molding.

In the injection molding method, a gas injection molding method can be adopted in order to prevent shrink of the appearance or reduce the weight.

A molded article comprising the polycarbonate resin composition of the present invention preferably has an SFL (spiral flow length) [thickness 2 mm] of 30 or more at 260° C. (280° C. in the case of containing a glass fiber).

A molded article obtained from the polycarbonate resin composition of the present invention is used in the field of the housings or parts for OA equipments and electric and electronic equipments such as copying machines, facsimiles, televisions, radios, tape recorders, video decks, personal computers, printers, telephones, information terminals, refrigerators and electronic ovens.

EXAMPLES

The present invention shall more specifically be explained below with reference to examples and comparative examples, but the present invention shall by no means be restricted by them.

Production Example 1

Preparation of Alkylphenol (a)

A reactor equipped with a baffle and a stirrer was charged with raw materials and a catalyst in a proportion of 300 mass parts of phenol, 110 mass parts [phenol/olefin=9/1 (mole ratio)] of 1-docosene and 11 mass parts of a strong acid polystyrene base sulfonic acid type cation exchange resin (Amberlyst 15, manufactured by Rohm & Haas Co., Ltd.) as the catalyst to carry out reaction at 120° C. for 3 hours under stirring.

After finishing the reaction, the reaction mixture was refined by distillation under reduced pressure to obtain alkylphenol (a). An alkyl group of the alkylphenol (a) thus obtained had 22 carbon atoms.

Production Example 2

Production of PC Oligomer

Bisphenol A 60 kg was dissolved in 400 liter of a 5 mass % sodium hydroxide aqueous solution to prepare a sodium hydroxide aqueous solution of bisphenol A.

Then, a tubular type reactor having an inside diameter of 10 mm and a tube length of 10 m was charged with the above sodium hydroxide aqueous solution of bisphenol A maintained at a room temperature at a flow rate of 138 liter/hour and methylene chloride at a flow rate of 69 liter/hour through an orifice plate, and phosgene was blown thereinto in a parallel current at a flow rate of 10.7 kg/hour to continuously react them for 3 hours.

The tubular type reactor used above had a double tube structure, and cooling water was allowed to pass through a jacket part to maintain a discharge temperature of the reaction liquid at 25° C. A pH of the reaction liquid was controlled to 10 to 11.

The reaction liquid thus obtained was left standing still to thereby separate and remove an aqueous phase, and a methylene chloride phase (220 liter) was taken to obtain a PC oligomer (concentration: 317 g/liter).

The PC oligomer obtained above had a polymerization degree of 2 to 4, and a chloroformate group had a concentration of 0.7 normal.

Production Example 3

Production of Reactive Polydimethylsiloxane (PDMS)

Octamethylcyclotetrasiloxane 1,483 g was mixed with 18.1 g of 1,1,3,3-tetramethyldisiloxane and 35 g of 86% sulfuric acid, and the mixture was stirred at a room temperature for 17 hours.

Then, the oil phase was separated, and 25 g of sodium hydrogencarbonate was added thereto, followed by stirring the mixture for one hour. After filtration, the filtrate was subjected to vacuum distillation at 150° C. and 3 torr ($4\times10^2$ Pa) to remove low boiling matters, whereby an oily matter was obtained.

The oily matter 294 g obtained above was added to the mixture of 60 g of 2-allylphenol and 0.0014 g of platinum having the form of a platinum chloride-alcolate complex at a temperature of 90° C.

The above mixture was stirred for 3 hours while maintaining at a temperature of 90 to 115° C.

The resulting product was extracted with methylene chloride and washed three times with aqueous methanol of 80% to remove excess 2-allylphenol. The product obtained was dried on anhydrous sodium sulfate, and the solvent was distilled off in the vacuum at a temperature of up to 115° C.

Resulting PDMS having phenol at a terminal was found to have a repetitive number of 150 in a dimethylsilanoxy unit by measurement of $^1$H-NMR.

Production Example 4

Production of PC-Polydimethylsoloxane (PDMS) Copolymer PC-2

The reactive polydimethylsoloxane (PDMS) 138 g obtained in Production Example 3 was dissolved in 2 liter of methylene chloride, and the solution thus prepared was mixed with 10 liter of the PC oligomer obtained above.

A solution prepared by dissolving 26 g of sodium hydroxide in 1 liter of water and 5.7 ml of triethylamine were added thereto to react them while stirring at 500 rpm and a room temperature for one hour.

After finishing the reaction, a solution prepared by dissolving 600 g of bisphenol A in 5 liter of a sodium hydroxide aqueous solution of 5.2 mass %, 8 liter of methylene chloride and 96 g of p-tert-butylphenol were added to the reaction system described above to react them while stirring at 500 rpm and a room temperature for 2 hours.

After finishing the reaction, 5 liter of methylene chloride was added thereto, and carried out in order were washing with 5 liter of water, alkali washing with 5 liter of a 0.03 normal sodium hydroxide aqueous solution, acid washing with 5 liter of 0.2 normal hydrochloric acid and washing twice with 5 liter of water. Finally, methylene chloride was removed to obtain a flake-like PC-PDMS copolymer PC-2.

The PC-PDMS copolymer PC-2 thus obtained was dried under vacuum at 120° C. for 24 hours.

The viscosity average molecular weight was 17,200, and the PDMS content was 3.0 mass %.

The PDMS content was determined according to the following procedure.

(1) PDMS Content

The content was determined based on an intensity ratio of a peak of a methyl group observed in 1.7 ppm in isopropyl of bisphenol A in $^1$H-NMR to a peak of a methyl group observed in 0.2 ppm in dimethylsiloxane.

Production Example 5

Production of Acrylonitrile-Styrene Copolymer AS-1

A stainless-steel-made reactor equipped with a stirrer was charged with 70 parts of styrene, 30 parts of acrylonitrile, 1.0 part of calcium phosphate, 0.03 part of GAFAC GB520 (brand name, dispersion aid, manufactured by Toho Chemical Co., Ltd.), 0.6 part of lauryl peroxide, 1.0 part of t-dodecylmercaptan and 200 parts of ion-exchanged water to carry out polymerization for 6 hours after elevating the temperature up to 80° C., whereby a copolymer having an intrinsic viscosity of 0.6 dl/g (20° C. in N,N'-dimethylformamide) was obtained at a conversion rate of 98%.

Examples 1 to 15 and Comparative Examples 1 to 10

The respective components were mixed in proportions [the components (A) and (B) were shown by weight %, and the other components were shown by mass parts per 100 mass parts of the resin comprising (A) and (B)] shown in Table 1, Table 2, Table 3 and Table 4, and the mixture was fed to a vent type double shaft extrusion-molding machine (TEM35, manufactured by Toshiba Machine Co., Ltd.) and molten and kneaded at 280° C. to produce pellets from it.

Irganox 1076 (manufactured by Ciba Specialty Chemicals Co., Ltd.) 0.1 mass part and Adekastab C (manufactured by Asahi Denka Co., Ltd.) 0.1 mass part were added as antioxidants to the raw material resins used in Examples 1 to 15 and Comparative Examples 1 to 10 prior to melting and kneading.

In Example 6, PEP-36 [bis(2,6-di-tert-butyl-4-methylphenyl)pentaerythritol diphosphite (manufactured by Asahi Denka Co., Ltd.) was added in place of Adekastab C (manufactured by Asahi Denka Co., Ltd.).

Next, the pellets obtained above were dried at 120° C. for 12 hours and then injection-molded at a molding temperature of 260° C. and a die temperature of 80° C. to obtain a test piece.

In Comparative Example 5 and Comparative Example 10, a drying temperature of 80° C., a molding temperature of 240° C. and a tool temperature of 40° C. were adopted.

The test pieces thus obtained were used and evaluated for performances by various tests, and the results thereof are shown in Table 1 and Table 2.

The molding materials used and the performance evaluation methods are shown below.

(A) Aromatic Polycarbonate Resins:
PC-1: FN1700A (manufactured by Idemitsu Petrochemical Co., Ltd.), bisphenol A polycarbonate resin, MFR=27 g/10 minutes (300° C., a load of 1.2 kg), viscosity average molecular weight: 17,800
PC-2: PC-PDMS, polydimethylsiloxane (PDMS)-containing bisphenol A polycarbonate resin, viscosity average molecular weight: 17,200, PDMS content: 3.0 mass %, PDMS chain length (n): 150
PC-3: FN1500 (manufactured by Idemitsu Petrochemical Co., Ltd.), bisphenol A polycarbonate resin, MFR=36 g/10 minutes (300° C., a load of 1.2 kg), viscosity average molecular weight: 14,300
PC-4: FN1900A (manufactured by Idemitsu Petrochemical Co., Ltd.), bisphenol A polycarbonate resin, MFR=19 g/10 minutes (300° C., a load of 1.2 kg), viscosity average molecular weight: 19,500

(B) Acrylonitrile-Styrene Base Resins:
AS-1: acrylonitrile-styrene copolymer, MFR=38 g/10 minutes (200° C., a load of 5 kg)
AS-2: acrylonitrile-styrene copolymer, BS-218 (manufactured by Nippon A & L Co., Ltd,), MFR=18 g/10 minutes (200° C., a load of 5 kg)
AS-3: acrylonitrile-styrene copolymer, 290FF (manufactured by Technopolymer Co., Ltd,), MFR=15 g/10 minutes (200° C., a load of 5 kg)
AS-4: acrylonitrile-styrene copolymer, 290N (manufactured by Technopolymer Co., Ltd,), MFR=3.5 g/10 minutes (200° C., a load of 5 kg)

(C) Impact Resistance-Improving Agents:
HIPS: high impact polystyrene, IT44 (manufactured by Idemitsu Petrochemical Co., Ltd.); resin prepared by graft-polymerizing polybutadiene with styrene; rubber content=10 mass %, MFR=8 g/10 minutes (200° C., a load of 5 kg)

Elastomer-1: EXL2603 (manufactured by Kureha Chemical Industry Co., Ltd.)
Elastomer-2: C223A (manufactured by Mitsubishi Rayon Co., Ltd.)
ABS-1: acrylonitrile-butadiene-styrene copolymer; B600N (manufactured by Ube Cyclon Co., Ltd.), rubber content: 60 mass %
ABS-2: acrylonitrile-butadiene-styrene copolymer; AT-05 (manufactured by Nippon A & L Co., Ltd.), MFR=5.2 g/10 minutes (200° C., a load of 5 kg)

(D) Organic Alkali Metal Salt and/or Organic Alkali Earth Metal Salt
Metal salt 1: sodium polystyrenesulfonate (manufactured by Lion Corporation)

(E) Functional Group-Containing Silicone Compound:
Silicone: methyl hydrogen silicone; X40-2664F (manufactured by Shin-Etsu Chemical Co., Ltd.)

(F) Inorganic Fillers:
Talc: TP-A25 (manufactured by Fuji Talc Ind. Co., Ltd.), average particle diameter: 4.9 μm Glass fiber: MA409C (manufactured by Asahi Glass Fiber Co., Ltd.)

(G) Polyfluoroolefin Resin:
PTFE: CD076 (manufactured by Asahi Glass Fluoropolymers Co., Ltd.)

(H) Phosphorus Base Flame Retardant: PFR (manufactured by Asahi Denka Co., Ltd.); resorcinol (diphenyl phosphate)

Performance Evaluation Methods
(1) SFL (Spiral Flow Length)
Measured on the conditions of an injection pressure of 80 kg/cm² (7.84 MPa), a molding temperature of 260° C. (280° C. when containing a glass fiber), a tool temperature of 80° C. and a thickness of 2 mm. Provided that the tool temperature was set to 40° C. in Comparative Example 5 and Comparative Example 10.
(2) IZOD (Izod Impact Strength)
Measured at 23° C. based on ASTM D256. Five pieces having a thickness of ⅛ inch were tested to determine an average value thereof. Unit: kJ/m².
(3) HDT (Heat Deformation Temperature, 1.83 MPa)
Measured based on ASTM D648. Unit: C.
(4) Flexural Modulus (MPa)
Measured based on ASTM D790. Unit: MPa.
(5) Combustibility
Measured based on UL94 combustion test.
Test piece thickness: 1.5 mm. A vertical combustion test was carried out according to Underwriters Laboratory Subject 94.

TABLE 1

| | | Example | | | | | | |
|---|---|---|---|---|---|---|---|---|
| | | 1 | 2 | 3 | 4 | 5 | 6 | 7 |
| Compo- sition | PC-1 | 70 | 70 | 70 | 70 | 68 | 85 | 70 |
| | PC-2 | 15 | 15 | 15 | 15 | 16 | 0 | 15 |
| | AS-1 | 15 | 15 | 0 | 0 | 16 | 15 | 15 |
| | AS-2 | 0 | 0 | 15 | 0 | 0 | 0 | 0 |
| | AS-3 | 0 | 0 | 0 | 15 | 0 | 0 | 0 |
| | AS-4 (comparison) | 0 | 0 | 0 | 0 | 0 | 0 | 0 |
| | HIPS | 0 | 0 | 0 | 0 | 0 | 0 | 0 |
| | Elastomer-1 | 3 | 0 | 3 | 3 | 0 | 3 | 0 |
| | Elastomer-2 | 0 | 3 | 0 | 0 | 0 | 0 | 0 |
| | ABS-1 | 0 | 0 | 0 | 0 | 5 | 0 | 0 |
| | ABS-2 | 0 | 0 | 0 | 0 | 0 | 0 | 0 |

TABLE 1-continued

| | | Example | | | | | | |
|---|---|---|---|---|---|---|---|---|
| | | 1 | 2 | 3 | 4 | 5 | 6 | 7 |
| | Metal salt | 0 | 0 | 0 | 0 | 0 | 0.1 | 0 |
| | Silicone | 0 | 0 | 0 | 0 | 0 | 0.3 | 0 |
| | Talc | 5 | 5 | 5 | 5 | 5 | 5 | 0 |
| | PTFE | 0.5 | 0.5 | 0.5 | 0.5 | 0.5 | 0.5 | 0 |
| Evalu- ation | SFL (260° C., Thickness 2 cm) | 36 | 36 | 33 | 31 | 36 | 36 | 37 |
| | IZOD (kJ/m²) | 48 | 48 | 50 | 55 | 46 | 46 | 8 |
| | HDT (1.83 MPa load) | 118 | 118 | 118 | 119 | 118 | 117 | 120 |
| | Flame resistance (1.5 mm, UL94) | V-1 | V-1 | V-1 | V-1 | V-1 | V-1 | V-1 |

TABLE 2

| | | Comparative Example | | | | |
|---|---|---|---|---|---|---|
| | | 1 | 2 | 3 | 4 | 5 |
| Compo- sition | PC-1 | 70 | 62 | 82 | 81 | 88 |
| | PC-2 | 15 | 16 | 18 | 19 | 0 |
| | AS-1 | 0 | 0 | 0 | 0 | 0 |
| | AS-2 | 0 | 0 | 0 | 0 | 0 |
| | AS-3 | 0 | 0 | 0 | 0 | 12 |
| | AS-4 (comparison) | 15 | 22 | 0 | 0 | 0 |
| | HIPS | 0 | 0 | 0 | 19 | 0 |
| | Elastomer-1 | 3 | 3 | 0 | 3 | 4 |
| | Elastomer-2 | 0 | 0 | 0 | 0 | 0 |
| | ABS-1 | 0 | 0 | 0 | 0 | 0 |
| | ABS-2 | 0 | 0 | 18 | 0 | 0 |
| | Metal salt | 0 | 0 | 0 | 0 | 0 |
| | Silicone | 0 | 0 | 0 | 0 | 0 |
| | Talc | 5 | 5 | 5 | 5 | 5 |
| | PTFE | 0.5 | 0.5 | 0.5 | 0.5 | 0.5 |
| | Phosphorus base flame retardant (PFR) | 0 | 0 | 0 | 0 | 8 |
| Evalua- tion | SFL (260° C., Thickness 2 cm) | 26 | 30 | 31 | 32 | 37 (240° C.) |
| | IZOD (kJ/m²) | 50 | 48 | 55 | 50 | 30 |
| | HDT (1.83 MPa load) | 119 | 116 | 120 | 118 | 80 |
| | Flame resistance (1.5 mm, UL94) | V-1 | V-2 out | V-2 out | V-2 out | V-0 |

It can be found from the results shown in Table 1 that the polycarbonate resin compositions of a non-halogen non-phosphorus compound which are improved in a fluidity while maintaining a flame resistance and a heat resistance are obtained by using the component (B) having a high melt flow rate.

Further, addition of the component (C) makes it possible to elevate the impact resistance without reducing the flame resistance.

It can be found from the results obtained in Comparative Examples 1 and 2 in Table 2 that the acrylonitrile-styrene base resin having a low melt flow rate provides the small effect of elevating the fluidity and reduces the flame resistance when increasing an addition amount.

Also, it can be found from the results obtained in Comparative Examples 3 and 4 that addition of only the component (C) (HIPS and ABS) makes it possible to elevate the fluidity and the impact resistant strength as well but reduces the flame resistance.

The phosphorus base flame retardant is added in Comparative Example 5, and therefore the flame resistance is excellent, but the heat resistance is very low.

TABLE 3

| | | \multicolumn{8}{c}{Example} |
|---|---|---|---|---|---|---|---|---|---|
| | | 8 | 9 | 10 | 11 | 12 | 13 | 14 | 15 |
| Composition | PC-1 | 0 | 0 | 66 | 88 | 0 | 0 | 0 | 0 |
| | PC-2 | 0 | 0 | 22 | 0 | 0 | 0 | 0 | 0 |
| | PC-3 | 94 | 0 | 0 | 0 | 94 | 94 | 94 | 94 |
| | PC-4 | 0 | 88 | 0 | 0 | 0 | 0 | 0 | 0 |
| | AS-1 | 6 | 12 | 12 | 0 | 6 | 6 | 6 | 6 |
| | AS-2 | 0 | 0 | 0 | 12 | 0 | 0 | 0 | 0 |
| | AS-4 (comparison) | 0 | 0 | 0 | 0 | 0 | 0 | 0 | 0 |
| | Elastomer-1 | 7 | 7 | 7 | 7 | 5 | 0 | 0 | 0 |
| | Elastomer-2 | 70 | 70 | 70 | 70 | 0 | 5 | 0 | 0 |
| | ABS-1 | 0 | 0 | 0 | 0 | 0 | 0 | 5 | 0 |
| | ABS-2 | 0 | 0 | 0 | 0 | 0 | 0 | 0 | 5 |
| | Metal salt | 0.1 | 0.1 | 0 | 0.1 | 0.1 | 0.1 | 0.1 | 0.1 |
| | Silicone | 0.3 | 0.3 | 0.3 | 0.3 | 0.3 | 0.3 | 0.3 | 0.3 |
| | Glass fiber | 10 | 10 | 10 | 10 | 10 | 10 | 10 | 10 |
| | Talc | 5 | 5 | 5 | 5 | 5 | 5 | 5 | 5 |
| | PTFE | 0.5 | 0.5 | 0.5 | 0.5 | 0.5 | 0.5 | 0.5 | 0.5 |
| Evaluation | SFL (280° C., Thickness 2 cm) | 37 | 33 | 35 | 35 | 35 | 35 | 36 | 36 |
| | IZOD (kJ/m$^2$) | 5 | 10 | 10 | 8 | 12 | 12 | 10 | 10 |
| | HDT (1.83 MPa load) | 135 | 137 | 136 | 136 | 135 | 135 | 135 | 135 |
| | Flexural modulus (MPa) | 4300 | 4500 | 4500 | 4400 | 4200 | 4200 | 4100 | 4100 |
| | Flame resistance (1.5 mm, UL94) | V-0 | V-0 | V-0 | V-0 | V-0 | V-0 | V-0 | V-0 |

TABLE 4

| | | \multicolumn{5}{c}{Comparative Example} |
|---|---|---|---|---|---|---|
| | | 6 | 7 | 8 | 9 | 10 |
| Composition | PC-1 | 0 | 70 | 0 | 0 | 0 |
| | PC-2 | 0 | 24 | 0 | 0 | 0 |
| | PC-3 | 94 | 0 | 100 | 100 | 0 |
| | PC-4 | 0 | 0 | 0 | 0 | 100 |
| | AS-1 | 0 | 0 | 0 | 0 | 0 |
| | AS-2 | 0 | 0 | 0 | 0 | 0 |
| | AS-4 (comparison) | 6 | 6 | 0 | 0 | 0 |
| | Elastomer-1 | 0 | 0 | 0 | 0 | 14 |
| | Elastomer-2 | 0 | 0 | 0 | 0 | 0 |
| | ABS-1 | 0 | 0 | 0 | 0 | 0 |
| | ABS-2 | 0 | 0 | 31 | 0 | 0 |
| | Metal salt | 0.1 | 0 | 0.1 | 0.1 | 0 |
| | Silicone | 0.3 | 0.3 | 0.3 | 0.3 | 0 |
| | Glass fiber | 10 | 10 | 10 | 10 | 14 |
| | Talc | 5 | 5 | 5 | 5 | 0 |
| | PTFE | 0.5 | 0.5 | 0.5 | 0.5 | 0.5 |
| | Phosphorus base flame retardant (PFR) | 0 | 0 | 0 | 0 | 14 |
| Evaluation | SFL (280° C., Thickness 2 cm) | 28 | 26 | 33 | 28 | 48 |
| | IZOD (kJ/m$^2$) | 5 | 10 | 12 | 5 | 10 |
| | HDT (1.83 MPa load) | 135 | 136 | 133 | 136 | 90 |
| | Flexural modulus (MPa) | 4100 | 4200 | 4100 | 4200 | 4200 |
| | Flame resistance (1.5 mm, UL94) | V-0 | V-0 | V-2 out | V-0 | V-0 |

It can be found from the results shown in Table 3 that the glass fiber-reinforced polycarbonate resin composition of a non-halogen-non-phosphorus compound which is improved in a fluidity while maintaining a flame resistance, a heat resistance and a rigidity is obtained by using the component (B) having a high melt flow rate.

It can be found from the results obtained in Comparative Examples 6 and 7 in Table 4 that the acrylonitrile-styrene base resin having a low melt flow rate provides the small effect of elevating the fluidity.

Also, it can be found from the results obtained in Comparative Example 8 that addition of only the component (C) (ABS) makes it possible to elevate the fluidity and the impact resistant strength but reduces the flame resistance.

Further, it can be found from the results obtained in Comparative Example 9 that merely a reduction in a molecular weight of the polycarbonate resin provides the small effect of elevating the fluidity.

It can be found from the results obtained in Comparative Example 10 that the phosphorus base flame retardant endows the polycarbonate resin composition with very excellent fluidity and flame resistance but with a very low heat resistance.

INDUSTRIAL APPLICABILITY

The polycarbonate resin composition of the present invention uses the acrylonitrile-styrene base resin having a melt flow rate (MFR) of 5 or more at 200° C. and a load of 5 kg as the component (B) and therefore does not contain halogen and phosphorus as a flame retardant component, and it is excellent in a fluidity while maintaining a flame resistance, a heat resistance and an impact resistance.

What is claimed is:

1. A polycarbonate resin composition, comprising:
   (A) an aromatic polycarbonate resin mixture comprising a polyorganosiloxane-containing aromatic polycarbonate resin;
   (B) an acrylonitrile-styrene base resin having a melt flow rate (MFR) of 5 or more at 200° C. and a load of 5 kg;
   (C) a core-shell type elastomer obtained by polymerizing at least one vinyl base monomer in the presence of a rubber-like polymer obtained from monomers comprising alkyl acrylate, alkyl methacrylate, dimethylsiloxane and a diene base compound;
   (D) a talc; and
   (E) a polyfluoroolefin resin;

wherein:
the aromatic polycarbonate resin mixture (A) is present in an amount of from 60 to 97 mass % based on a total mass of the aromatic polycarbonate resin mixture (A) and the acrylonitrile-styrene base resin (B);
the acrylonitrile-styrene base resin (B) is present in an amount of from 3 to 40 mass % based on the total mass of the aromatic polycarbonate resin mixture (A) and the acrylonitrile-styrene base resin (B);
the core-shell type elastomer (C) is present in an amount of 1 to 37 mass parts per 100 mass parts of the aromatic polycarbonate resin mixture (A) and the crylonitrile-styrene base resin (B);
the talc (D) is present in an amount of from 1 to 20 mass parts per 100 mass parts of the aromatic polycarbonate resin mixture (A) and the acrylonitrile-styrene base resin (B);
the polyfluoroolefin resin is present in an amount of from 0.1 to 2 mass parts per 100 mass parts of the aromatic polycarbonate resin mixture (A) and the acrylonitrile-styrene base resin (B);
the composition optionally comprises per 100 mass parts of the aromatic polycarbonate resin mixture (A) and the acrylonitrile-styrene base resin (B):
(F) an organic alkali metal salt and/or an organic alkali earth metal salt in an amount of from 0 to 3 mass parts; and
(G) a functional group-containing silicone compound in an amount of from 0 to 3 mass parts;
the organic alkali metal salt and/or the organic alkali earth metal salt (F) comprises at least one member selected from the group consisting of sulfonic acid alkali metal salts, sulfonic acid alkali earth metal salts, polystyrenesulfonic acid alkali metal salts and polystyrenesulfonic acid alkali earth metal salts; and
the composition is free from halogen-based and phosphorous-based flame retardants.

2. The polycarbonate resin composition as claimed in claim 1, wherein the acrylonitrile-styrene base resin (B) has a melt flow rate (MFR) of 15 or more at 200° C. and a load of 5 kg.

3. The polycarbonate resin composition as claimed in claim 1, wherein the acrylonitrile-styrene base resin (B) has a melt flow rate (MFR) of 30 or more at 200° C. and a load of 5 kg.

4. The polycarbonate resin composition as claimed in claim 1, wherein polyorganosiloxane of the polyorganosiloxane-containing aromatic polycarbonate resin is polydimethylsiloxane.

5. The polycarbonate resin composition as claimed in claim 1, wherein a molecular end of the aromatic polycarbonate resin is an alkyl group having 10 to 35 carbon atoms.

6. The polycarbonate resin composition as claimed in claim 1, wherein the acrylonitrile-styrene base resin (B) is an acrylonitrile-styrene copolymer having an acrylonitrile content of 15 to 40 mass %.

7. The polycarbonate resin composition as claimed in claim 1, wherein:
the functional group-containing silicone compound (G) is present in the composition; and
the functional group-containing silicone compound (G) is organopolysiloxane having a fundamental structure presented by Formula (1):

$$R^1_a R^2_b SiO_{(4-a-b)/2} \tag{1}$$

wherein $R^1$ represents a functional group; $R^2$ represents a hydrocarbon group having 1 to 12 carbon atoms; and a and b are numbers satisfying the relation of $0<a\leqq3$, $0\leqq b<3$ and $0<a+b\leqq3$.

8. The polycarbonate resin composition as claimed in claim 7, wherein $R^1$ is at least one selected from an alkoxy group, a hydrogen group, a hydroxyl group, an epoxy group and a vinyl group.

9. The polycarbonate resin composition as claimed in claim 1, wherein the polyfluoroolefin resin (E) is polytetrafluoroethylene.

10. The polycarbonate resin composition as claimed in claim 9, wherein the polytetrafluoroethylene is endowed with a fibril-forming ability and has an average molecular weight of 500,000 to 10,000,000.

11. A molded article comprising the polycarbonate resin composition as described in claim 1.

* * * * *